US012683404B2

(12) United States Patent
Harris et al.

(10) Patent No.: US 12,683,404 B2
(45) Date of Patent: Jul. 14, 2026

(54) AC COUPLED CONTROLLER FOR POWER FLOW CONTROL VIA ELECTRIC VEHICLE DURING ISLANDING FROM GRID

(71) Applicant: Ford Global Technologies, LLC, Dearborn, MI (US)

(72) Inventors: Timothy Harris, Grosse Ile, MI (US); Haider Mhiesan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 8 days.

(21) Appl. No.: 18/657,250

(22) Filed: May 7, 2024

(65) Prior Publication Data

US 2025/0350121 A1 Nov. 13, 2025

(51) Int. Cl.
| | |
|---|---|
| *H02J 3/32* | (2026.01) |
| *B60L 53/22* | (2019.01) |
| *B60L 55/00* | (2019.01) |
| *H02J 3/38* | (2006.01) |
| *B60L 50/60* | (2019.01) |
| *H02J 101/24* | (2026.01) |

(52) U.S. Cl.
CPC .............. *H02J 3/322* (2020.01); *B60L 53/22* (2019.02); *B60L 55/00* (2019.02); *H02J 3/38* (2013.01); *B60L 50/60* (2019.02); *H02J 2101/24* (2026.01); *Y04S 10/126* (2013.01)

(58) Field of Classification Search
CPC .......... H02J 3/322; H02J 3/38; H02J 2300/24; B60L 53/22; B60L 55/00; B60L 50/60; Y04S 10/126
See application file for complete search history.

(56) References Cited

U.S. PATENT DOCUMENTS

| | | | |
|---|---|---|---|
| 2019/0217739 A1* | 7/2019 | Sinha | B60L 53/62 |
| 2020/0358310 A1 | 11/2020 | Khatib et al. | |
| 2023/0048414 A1* | 2/2023 | Kinomura | B60L 53/16 |
| 2024/0174108 A1* | 5/2024 | Jing | H01M 10/425 |

FOREIGN PATENT DOCUMENTS

| | | | | |
|---|---|---|---|---|
| CN | 109478787 B | 9/2023 | | |
| CN | 113300408 B | 10/2023 | | |
| FR | 3139209 A1 * | 3/2024 | | H04W 4/40 |
| WO | 2011148531 A1 | 12/2011 | | |

* cited by examiner

*Primary Examiner* — Daniel Cavallari
(74) *Attorney, Agent, or Firm* — David B. Kelley; Benjamin C. Stasa

(57) ABSTRACT

A vehicle controller, responsive to a command from a remote controller, alters a frequency at which a vehicle inverter applies an AC potential to a power network such that an AC power output to the power network by a remote distributed energy resource, such as a solar power system, synchronized with the vehicle inverter decreases.

14 Claims, 3 Drawing Sheets

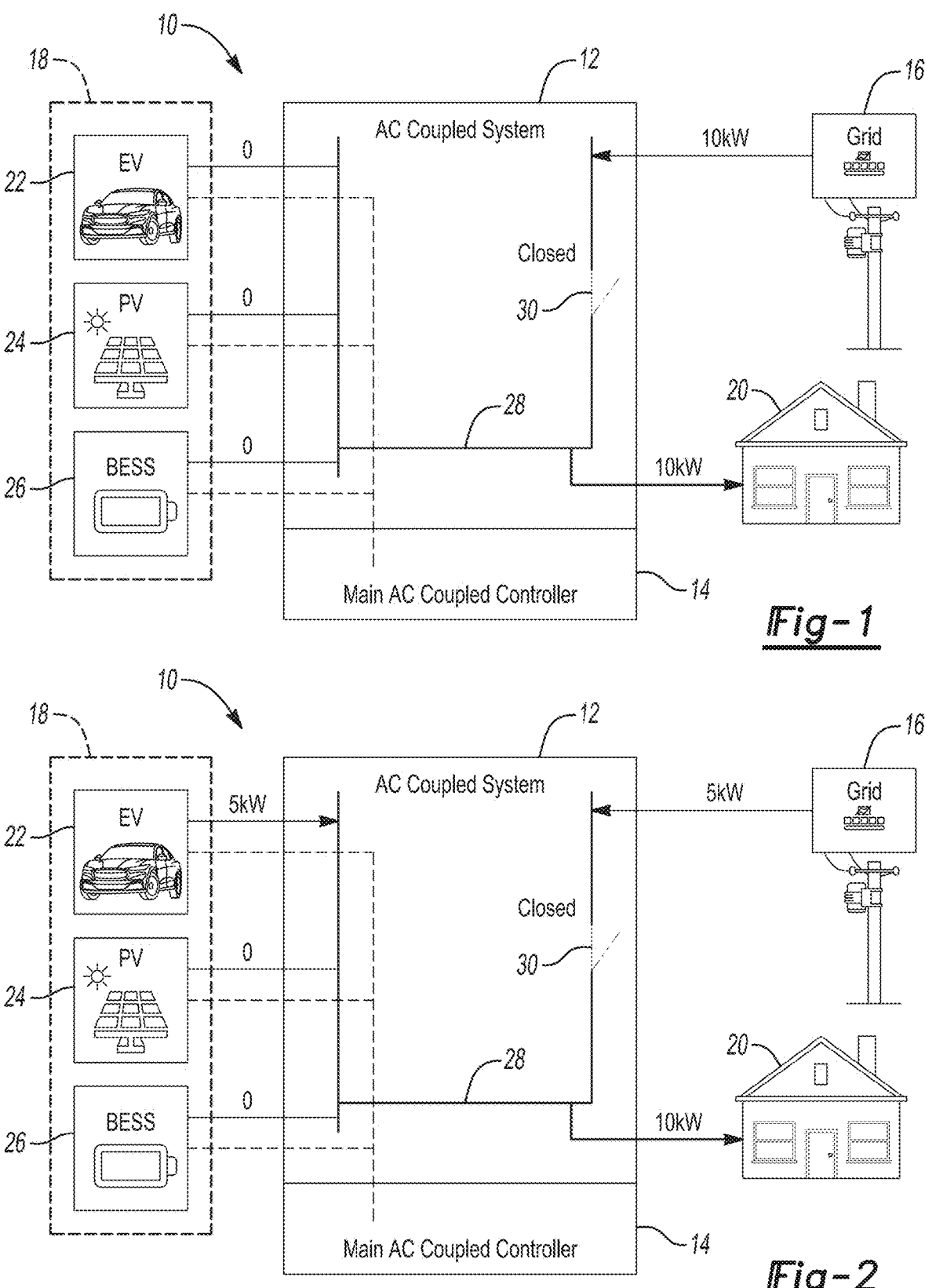
_Fig-1_
_Fig-2_

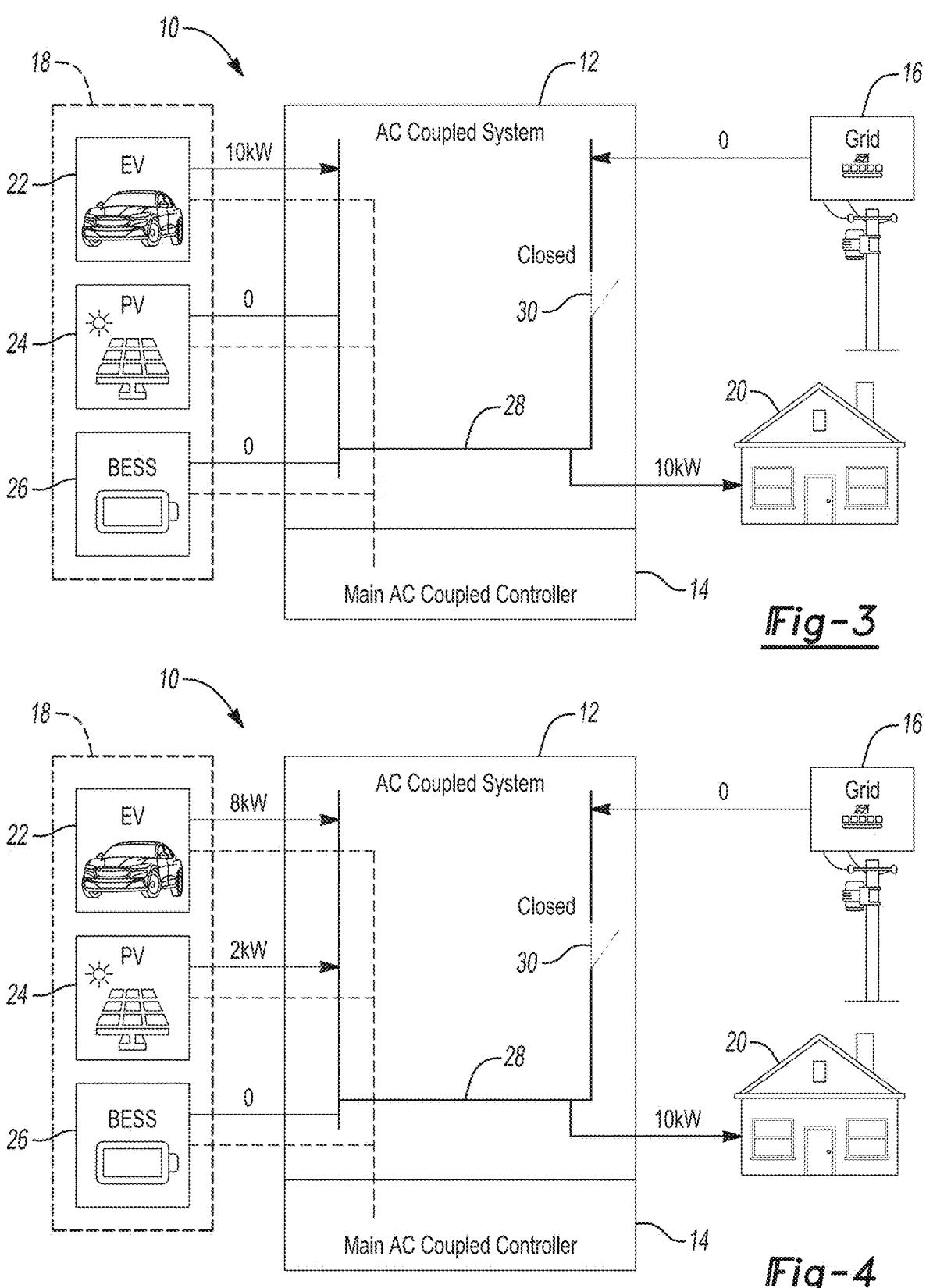
_Fig-3_
_Fig-4_

AC COUPLED CONTROLLER FOR POWER FLOW CONTROL VIA ELECTRIC VEHICLE DURING ISLANDING FROM GRID

TECHNICAL FIELD

This disclosure relates to power management for homes and other buildings.

BACKGROUND

A home energy system, adaptable based on geographic and environmental factors, can incorporate solar panels alongside other renewable sources. To complement these, lithium-ion batteries might be employed to store the electricity harvested from these renewable sources. This is particularly useful during periods when production wanes, such as nighttime for solar power. The stored energy is then converted from direct current (DC) to alternating current (AC) by inverters, making it suitable for household appliances.

Furthermore, integration with the conventional power grid provides a backup source of energy when the output from renewable sources and stored reserves falls short. This connection also offers homeowners the opportunity to sell surplus energy back to the grid through mechanisms like net metering, which can help mitigate issues further. Energy management systems play a role in orchestrating these diverse energy streams and may incorporate sensors to monitor various power-related parameters.

SUMMARY

A vehicle includes a traction battery, an inverter configured to be electrically connected between the traction battery and a power network remote from the vehicle, and a controller. The controller, responsive to a command from a controller remote from the vehicle, alters a frequency at which the inverter applies an AC potential to the power network such that an AC power output to the power network by a distributed energy resource remote from the vehicle decreases.

A method includes altering a frequency of an AC potential applied by an inverter of a vehicle to a power network remote from the vehicle such that a power output by a distributed energy resource remote from the vehicle and to the power network increases.

A power system for a vehicle includes an inverter configured to be connected with a power network remote from the vehicle, and a controller. The controller, responsive to a command from a controller remote from the vehicle, operates the inverter to apply an AC potential to the power network at a frequency defined by the command.

BRIEF DESCRIPTION OF THE DRAWINGS

FIG. 1 is a schematic diagram of a power system using a grid to satisfy home power demand.

FIGS. 2 and 3 are schematic diagrams of the power system of FIG. 1 transitioning from grid power to distributed energy resources while continuing to satisfy the home power demand.

FIG. 4 is a schematic diagram of the power system of FIG. 1 redistributing supply among the distributed energy resources while continuing to satisfy the home power demand.

DETAILED DESCRIPTION

Figure 5:
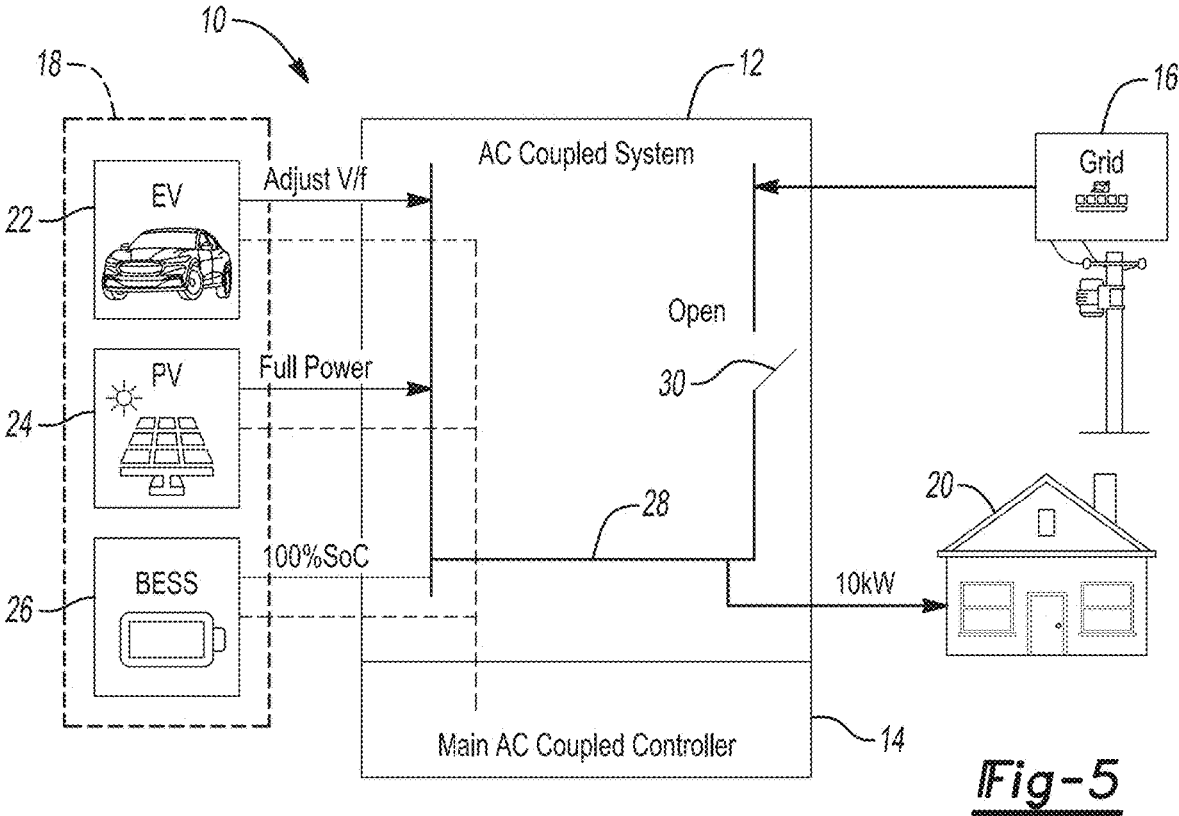
FIG. 5 is a schematic diagram of the power system of FIG. 1 in which the grid has become unavailable and one of the distributed energy resources is producing surplus power that cannot be otherwise consumed or stored.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

IEEE 1547 is a standard that provides guidelines for the interconnection and interoperability of distributed energy resources with electric power systems and associated interfaces. The standard covers various aspects of power generation, including voltage, frequency, and the quality of power supplied to the grid. It sets forth requirements for the performance, operation, testing, and maintenance of the interconnection, and aims to ensure that distributed energy resources, such as solar panel systems, wind turbine systems, and other forms of renewable energy sources, can connect to and operate within the electric power grid.

The standard generally outlines acceptable operational ranges for frequency to permit stability and reliability of the grid. Operating outside these standard frequency ranges (typically centered around 60 Hz in North America and 50 Hz in many other parts of the world) could affect grid stability and distributed energy resource equipment.

Distributed energy sources are becoming more common. The same can be used to support home power requirements. That is, these sources can be used in combination with, or instead of, grid power.

This disclosure proposes architectures and control strategies for facilitating power transfer between a grid, various distributed energy resources (e.g., an electric vehicle, a solar panel system, a home energy storage system, etc.), and a home or other building. An AC coupled controller can facilitate power transfer between the distributed energy resources and home or other building when the grid becomes unavailable. The electric vehicle assumes main control over power flow of the distributed energy resources and can influence the same by adjusting its frequency, while not contributing current to the power network, to alter power output by the other distributed energy resources without directly communicating with them.

If, for example, the grid becomes unavailable, the AC coupled controller may designate a controller of the electric vehicle as the lead controller. When the solar panel system operating optimally at 60 Hz produces too much power (e.g., more power than the home or other building can use and more power than the home energy storage system can store), the controller of the electric vehicle can (as the lead) alter the frequency of vehicle inverter voltage to 61 Hz or higher (but still within the range defined by IEEE 1547) while not contributing current to the network. The solar panel system will synchronize thereto being connected to the same network, which will drive down power output from the solar panel system.

Synchronizing power sources generally involves matching voltage, frequency, and phase angle with that of the lead. An inverter of a distributed energy resource may control the frequency and phase synchronization. Phase-locked loops (PLLs) can be used to lock onto the frequency and phase defined by the lead. The PLL adjusts the inverter's output frequency and phase by changing the switching rate of the inverter's power electronic devices so that the output frequency and phase match the lead's frequency and phase. Algorithms within the inverter may continually monitor the lead's output via sensors and adjust the inverter's output to maintain synchronization. This may include dynamic adjustments to deal with variations imposed by the lead.

The process of synchronization for the solar power system when the vehicle is the lead begins with detecting the vehicle inverter's frequency, voltage, and phase angle using sensors and electronic measurement circuits for the network. Based on this information, known control algorithms adjust the power electronic devices' output to match that of the vehicle inverter. This involves adjusting the timing of the switching actions within the inverter or converter to, for example, shift the frequency of the output power. The solar power system continuously monitors network conditions and adjusts its output to maintain synchronization, adapting to any changes in vehicle inverter frequency or voltage that might occur.

Referring to FIG. 1, an energy management system 10 includes an AC coupled system 12 and an AC coupled controller 14. The energy management system 10 is arranged to be connected with a grid 16 and distributed energy resources 18, and to supply energy to home 20. The AC coupled controller 14 is in communication with/exerts control over the distributed energy resources 18, which in this example include an electric vehicle 22, a solar power (photo voltaic) system 24, and battery (battery energy storage) system 26. The AC coupled system 12 includes circuitry 28 electrically connecting each of the distributed energy resources 18 and home 20, and a switch 30 configured to selectively connect the grid 16 to the distributed energy resources 18 and home 20.

The indicia of the electric vehicle 22 represents, among other things, a traction battery, a controller, and an inverter in which the inverter can be connected between the traction battery and circuitry 28 in known fashion. The indicia of the solar power system 24 represents, among other things, solar panels and an inverter in which the inverter is connected between the solar panels and circuitry 28 in known fashion. The indicia of the battery system 26 represents, among other things, storage cells and an inverter in which the inverter is connected between the storage cells and circuitry 28.

When the switch 30 is closed, power from the grid 16 may flow to the home 20. In this example, the home 20 is demanding 10 kW and the grid is supplying 10 kW. In preparation for sourcing some of the power to be supplied to the home 20 from the distributed energy resources 18, the AC coupled controller 14 synchronizes those of the distributed energy resources 18 that are to supply power to the home 20 with that of the grid 16. As suggested above, the AC coupled controller 14 detects the frequency, voltage, and phase angle of power from the grid 16 via known sensors and electronic measurement circuits and commands inverters of those of the distributed energy resources 18 that are to supply power to the home 20 to adjust the timing of their switching actions to match the frequency, voltage, and phase angle of the power from the grid 16.

Referring to FIG. 2, the home 20 continues to demand 10 kW. The AC coupled controller 14, however, has reduced the supply of power from the grid to 5 kW and increased the power supplied from the electric vehicle 22 to 5 kW—continuing to satisfy the demand of the home 20. That is, while the AC coupled controller 14 reduced the power from the grid 16 via commands to the converter interfaced with the grid 16, it concurrently increased the power from the electric vehicle 22 via commands thereto so that the total amount of power being supplied to the home 20 remained the same.

Referring to FIG. 3, the AC coupled controller 14 has reduced the supply of power from the grid to 0 kW and increased the power supplied from the electric vehicle 22 to 10 kW. The electric vehicle 22 is completely responsible for satisfying the power demanded by the home 20.

Referring to FIG. 4, the AC coupled controller 14 next redistributes the supply among the distributed energy resources 18. The AC coupled controller 14 commands the electric vehicle 22 to reduce the amount of power it is supplying and concurrently commands the solar power system 24 to increase the amount of power it is supplying so that the net power delivered to the home 20 remains unchanged. In this example, the AC coupled controller 14 commands the electric vehicle 22 to supply 8 kW and the solar power system 24 to supply 2 kW, which in total is sufficient to satisfy the 10 kW demand from the home 20.

Referring to FIG. 5, the AC coupled controller 14 redistributes the supply such that the solar power system 24 is the sole source of power to satisfy demand by the home 20. The grid 16 has become unavailable and the solar power system 24 is producing a surplus of power (e.g., more than 10 kW in this example) that cannot be consumed or otherwise stored because the grid 16 is unavailable and the traction battery of the electric vehicle 22 and the storage cells of the battery system 26 are at 100% state of charge.

The AC coupled controller 14 detects unavailability of the grid 16 via known sensors and techniques, opens the switch 30, and designates the controller of the electric vehicle 22 as the lead via communication therewith. That is, the electric vehicle 22 will act in place of the grid 16 by applying an AC potential via its inverter to the network at a particular frequency, which may be defined by the AC coupled controller communication, without supplying current to the network such that the other distributed energy resources 18 will effectively synchronize with the electric vehicle 22 as the distributed energy resources 18 are connected to the same network and the grid 16 is disconnected from the network.

The AC coupled controller 14 via known sensors and electronic measurement circuits detects the solar power system 24 is producing surplus power. The AC coupled controller 14 via its communication channels with the electric vehicle 22 and battery system 26 also monitors the states of charge of the traction battery and storage cells of the electric vehicle 22 and battery system 26, respectively. As mentioned above, the traction battery and storages cells are "full." As a result, the AC coupled controller 14 instructs the controller of the electric vehicle 22 to alter the frequency of its voltage away from the optimum of 60 Hz in North America (and 50 Hz in other parts of the world) to a higher value such that, after the solar power system 24 synchronizes thereto, its power output reduces to a level that no longer results in a surplus (10 kW in this example).

The AC coupled controller 14 may continue to monitor via known techniques and equipment demand from the home 20. As the demand rises beyond that which the solar power system 24 is producing given its operation at elevated frequency, the AC coupled controller 14 may instruct the controller of the electric vehicle 22 to reduce the frequency of its voltage such that, after the solar power system 24 synchronizes thereto, its power output increases to a level to satisfy the increased demand of the home 20.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. Moreover, the words used in the specification are words of description rather than limitation, and it is understood that various changes may be made without departing from the spirit and scope of these disclosed materials. "Controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery;
an inverter configured to be electrically connected between the traction battery and a power network remote from the vehicle; and
a controller programmed to, responsive to a command from a controller remote from the vehicle, alter a frequency at which the inverter applies an AC potential to the power network such that an AC power output to the power network by a distributed energy resource remote from the vehicle decreases.

2. The vehicle of claim 1, wherein altering the frequency is increasing the frequency.

3. The vehicle of claim 2, wherein the frequency is greater than 60 Hz after the altering.

4. The vehicle of claim 1, wherein the controller is further programmed to, responsive to another command from the controller remote from the vehicle, further alter the frequency such that the AC power output by the distributed energy resource increases.

5. The vehicle of claim 4, wherein further altering the frequency is decreasing the frequency.

6. The vehicle of claim 1, wherein the controller is further programmed to, responsive to another command from the controller remote from the vehicle, apply an AC potential to the power network at a frequency defined by the another command.

7. The vehicle of claim 1, wherein the distributed energy resource is a solar power system.

8. A method comprising:
altering a frequency of an AC potential applied by an inverter of a vehicle to a power network remote from the vehicle such that a power output by a distributed energy resource remote from the vehicle and to the power network increases.

9. The method of claim 8, wherein the altering includes decreasing.

10. The method of claim 8 further comprising further altering the frequency such that the power output decreases.

11. The method of claim 10, wherein the further altering includes increasing.

12. The method of claim 11, wherein the frequency is greater than 60 Hz after the further altering.

13. The method of claim 8 further comprising applying an AC potential to the power network at a frequency defined by a command received from a controller remote from the vehicle.

14. The method of claim 8, wherein the distributed energy resource is a solar power system.

* * * * *